United States Patent [19]

Ferraiuolo et al.

[11] Patent Number: 4,905,299
[45] Date of Patent: Feb. 27, 1990

[54] HOLD DOWN BEARING RETAINER

[75] Inventors: Diamond G. Ferraiuolo, Livonia, Mich.; James R. Ure, Tecumseh, Canada

[73] Assignee: Chrysler Motors Corporation, Highland Park, Mich.

[21] Appl. No.: 392,877

[22] Filed: Aug. 14, 1989

[51] Int. Cl.⁴ .............................................. F16C 43/04
[52] U.S. Cl. ..................................... 384/585; 384/542
[58] Field of Search .............. 384/295, 438, 439, 537, 384/541, 542, 559, 562, 584, 585

[56] References Cited

U.S. PATENT DOCUMENTS

| | | | |
|---|---|---|---|
| 2,731,575 | 1/1956 | Hershberger | 384/537 X |
| 2,772,929 | 12/1956 | Eastman | 384/542 |
| 3,469,897 | 9/1969 | Rike | 384/542 |
| 4,386,812 | 6/1983 | Anderson | 384/542 |
| 4,637,806 | 1/1987 | Olschewski et al. | 384/559 X |

Primary Examiner—Thomas R. Hannon
Attorney, Agent, or Firm—Edward P. Barthel

[57] ABSTRACT

A single bolt hold-down bearing retainer device for a bearing assembly nested in a circular cavity of a cast housing. The retainer is in the form of a plate-like device having two adjacent linear edges intersecting at a radiused juncture defining an obtuse included angle. Each of the edges is formed with an upwardly angled locating tab extending in opposed relation to an associated housing wall portion. An attachment slot is provided in the retainer device intermediate the radiused juncture and a concave annular edge with the slot principal axis disposed bisecting the included angle. The free end of each tab contacting its associated opposed wall portion whereby the slot is adjustably aligned with a subjacent borehole. Upon a single bolt threadably engaging the housing borehole the bearing retainer is secured thereon against rotation while its arcuate concave edge is concentrically disposed on a sector of the thrust collar releasably securing the bearing assembly in the cavity.

3 Claims, 1 Drawing Sheet

HOLD DOWN BEARING RETAINER

BACKGROUND OF THE INVENTION

This invention relates generally to a hold down bearing retainer device and, more particularly, to a bearing retainer device securable by means of a single fastener.

Prior art bearing retainer plates or straps for securing the outer race of a roller or ball bearing are known. An example of one such roller bearing retainer plate for a roller bearing assembly 22 is shown, for example, adapted for telescopic reception in a cast metal housing 10 shown by the "prior art" FIG. 6 of the drawings. It will be noted that the roller bearing retainer strap "a" is provided with a pair of attachment boreholes "b" defined at either end thereof for receiving bolts "c" threadably engaged in associated bores of the casting 10. The bearing retainer strap "a" is formed with an arcuate inner engaging edge portion "d" conforming to the curvature of outer race thrust collar 26 of the roller bearing assembly 22 so as overlie a section of its outer periphery. While the retainer strap "a" is effective in preventing any undesired movement of the bearing outer cup, it requires a pair of fasteners "c" which adds to the size and expense of the assembly and involves additional time in mounting.

SUMMARY OF THE INVENTION

It is an object of the present invention to provide a one piece bearing retainer device of reduced size for securing a bearing assembly in a mating circular passageway formed, for example, in a cast transmission housing which requires only a single fastener.

It is another object of the present invention to provide a one piece bearing retainer as set forth above wherein the retainer is self-adjustable attaining a fixed anti-rotation fit relative to a pair of adjacent walls of the housing the imaginary planes of which intersect at a predetermined obtuse dihedral angle.

It is a further object of the present invention to provide a one piece bearing retainer device as set forth above wherein an adjustable attachment slot for the single fastener is oriented with its major centerline intersecting the obtuse dihedral angle defined by the pair of housing walls.

It is still another object of the present invention to provide a bearing retainer device as set forth above wherein an anti-rotational tab extends from each retainer linear edge having a line-contact raised locating edge contacting its associated wall portion whereby the principal centerline of the attaching slot is adjustably aligned with a housing borehole for engagement by the single threaded fastener.

A hold-down retainer device is disclosed for a roller bearing assembly telescopically received in axially extending circular cavity of a transmission cast housing or the like. The retainer device is in the form of a plate-like member having two adjacent linear edges intersecting at a radiused juncture defining a predetermined included obtuse angle. Each of the edges is formed with a locating tab extending in perpendicularly relation to an opposed wall portion of the housing. An attachment slot is provided in the retainer adjacent the radiused juncture with an extension of the slot principal axis bisecting the included obtuse angle. The free end of each tab is adapted to contact its associated opposed wall portion such that the slot is adjustably aligned with a subjacent borehole. Upon the tabs contacting their respective wall portions and a single threaded bolt threadably engaging the borehole the bearing retainer is secured against rotation. An arcuate concave inner edge of the retainer is concentrically oriented on an annular sector of the bearing outer race thrust collar obviating removal of the bearing assembly.

DESCRIPTION OF THE DRAWINGS

These and other features, objects and advantages of the invention will become apparent upon consideration of the specification and appended claims in which:

DESCRIPTION OF THE PREFERRED EMBODIMENT

Figure 1:
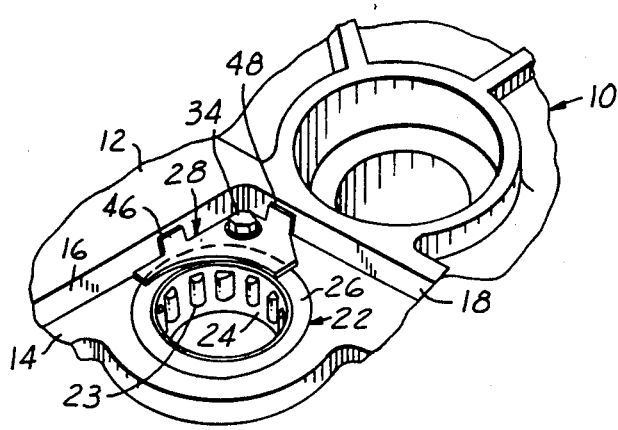
FIG. 1 is a fragmentary, perspective view of a vehicle transmission cast metal housing in which the bearing retainer of the present invention has been incorporated.

Referring now to the drawings, there is shown in FIG. 1 a portion of a vehicle transmission cast metal housing, generally indicated at 10, having a casting wall 12 formed with a recessed planar area 14 defined in part by a pair of upstanding substantially vertically disposed adjacent wall portions 16 and 18. In the disclosed embodiment of FIG. 2 the wall portions 16 and 18 are shown intersecting at an obtuse included dihedral angle which in the form depicted is about 120 degrees. The casting wall 12 is formed with a circular vertically disposed opening or cavity, having a principal axis 20 with the cavity inner surface partially indicated at 21 in FIG. 2, telescopically receiving a cup-shaped roller bearing assembly 22. The bearing assembly has conventional vertically disposed uniformly paced cylindrical rollers shown at 23 with each roller suitably retained in an opening in bearing cage 24.

Figure 2:
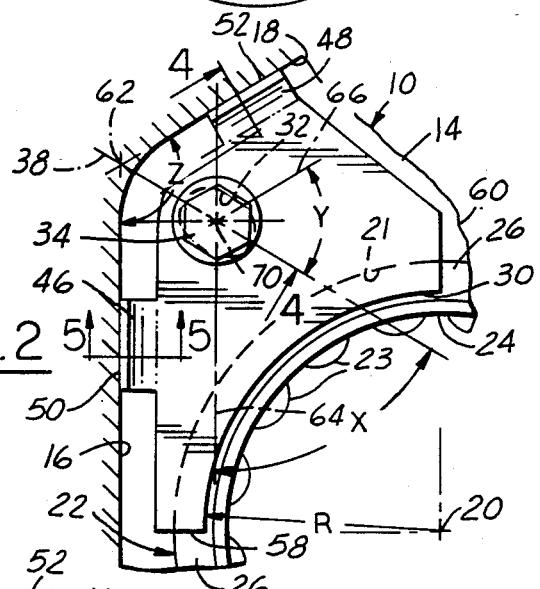
FIG. 2 is a fragmentary top elevational view of the transmission housing showing the single bearing retainer securing a roller bearing race.
Figure 6:
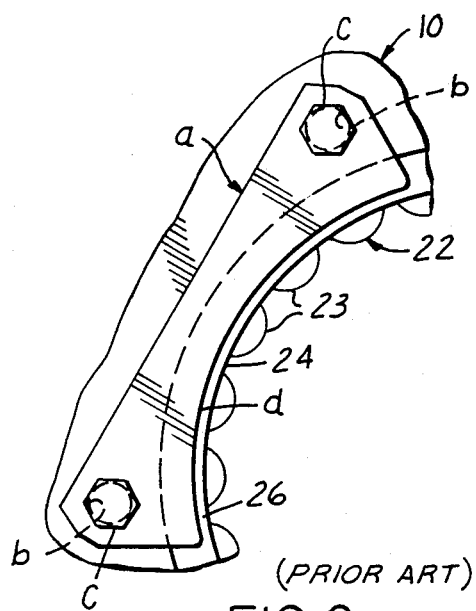
FIG. 6 is a fragmentary top elevational view similar to FIG. 2 showing a prior art bearing retainer strap.

The bearing assembly cylindrical cage is formed with an upper radially outwardly directed flange or thrust collar 26 having its upper face axially positioned substantially flush with the surface of the recessed area 14. A single plate-like bearing retaining device, indicated generally at 28, is preferably stamped from sheet steel and is formed in a substantially fan-like configuration having an arcuate concave inner edge 30 adapted for concentric positioning about the opening principal axis 20. As seen in FIG. 2 the arcuate inner edge 30 is generated by a radius "R" centered on the principal axis 20 of the cavity 21.

The bearing retainer device 28 has an elongated oval-shaped attachment aperture or slot 32 extending therethrough sized for receiving a single fastener which in the dislosed from is a hex head bolt 34 adapted for threaded engagement with an internally threaded borehole 35 (FIG. 4) formed in the recessed area 14 of the casting. It will be noted in FIG. 3 that the principal axis or centerline 36 of the attachment slot 32 is adapted for alignment on dashed bisecting construction line 38 of FIG. 2 with the retainer device 28 in its releasably secured position fixed on the recessed surface of area 14.

Figure 4:
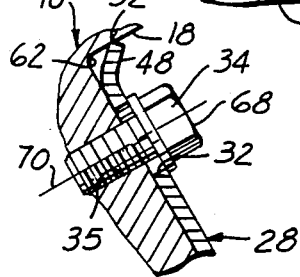
FIG. 4 is a vertical sectional view taken on the line 4—4 of FIG. 2.
Figure 5:
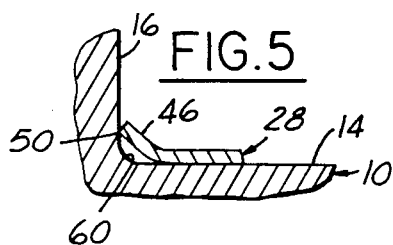
FIG. 5 is a vertical sectional view taken on the line 5—5 of FIG. 2.
Figure 3:
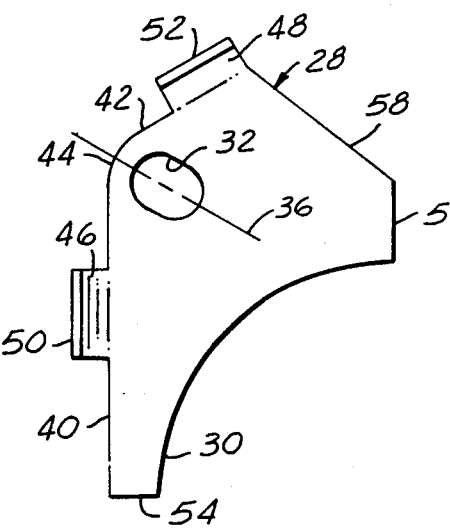
FIG. 3 is a detail top elevational view of the bearing retainer shown in FIG. 2.

As seen in FIG. 3 the retainer device is defined by first 40 and second 42 linear edges intersecting at a radiused juncture 44. The first 40 and second 42 linear edges are provided with integrally-formed upwardly angled locating tabs 46 and 48, respectively. With reference to FIGS. 4 and 5 it will be noted that the tabs 46 and 48 terminate in raised line-contact edges 50 and 52, respectively. Each raised line-contact edge 50 and 52 adapted for engaging its associated opposed casting wall 16 and 18, respectively. It will be noted that each raised line-contact edge 50 and 52 is oriented parallel to its associated bearing retainer device side edges 40 and 42, respectively. The bearing retainer device perimeter is completed by a pair of truncated edges 54 and 56 together with an angled edge 58. It will be noted that the projections of the edges 54 and 56 intersect the principal axis 20 of the bearing cavity 21 at a right angle. Thus, the bearing retainer device inner arcuate concave edge 30 extends through an included arc of substantially ninety degrees of the circular bearing assembly opening 21.

Further, in the disclosed embodiment of FIG. 2 it will be seen that the bisecting centerline 38 defines equal angles "X" and "Y" with their associated dashed construction lines 64 and 66 intersecting the principal axis 70 of the tapped borehole 35. The pre-drilled borehole 35 in the housing 10 is shown in FIG. 4 positioned at a predetermined location on the bisecting construction line 38. An imaginary vertical plane that includes construction line 38 bisects the included obtuse dihedral angle "Z" defined by projections of a pair of imaginary intersecting planes including the respective faces of wall portions 16 and 18. It will be appreciated that in the disclosed form of the invention the angles "X" and "Y" are equal and are of the order of 60 degrees while the included dihedral angle "Z" is of the order of 120 degrees.

With reference to FIGS. 4 and 5 the locating tabs 46 and 48 are identical and are angled upwardly insuring that their associated line-contact edges 50 and 52 contact their respective wall portions 16 and 18. That is the angled tabs 46 and 48 allow clearance with radii 60 and 62 that are typical with intersecting cast walls.

Having thus described the invention, modification thereof will be apparent to those skilled in the art.

What is claimed is:

1. In a bearing assembly of the type used to rotatably mount a shaft in a cast metal housing, said bearing assembly sized and configured for reception in an axially extending circular cavity formed in a recessed surface of said housing so as to journally support the shaft on the axis of said cavity, wherein the bearing assembly includes an annular thrust collar concentrically disposed about said cavity, retainer means acting to prevent axial separation of said thrust collar from said housing recessed surface, said housing recessed surface defined in part by a pair of substantially vertically disposed wall portions wherein the imaginary planes of said wall portions intersecting at a predetermined obtuse included dihedral angle, the improved retainer means for said bearing assembly comprising:

a one piece metallic plate-like bearing retainer device having an elongated attachment slot extending intermediate a radiused juncture of first and second outer linear edges and an inner concave arcuate edge of said device, extensions of said first and second linear edges intersecting at an imaginary common point defining an included obtuse angle, said attachment slot having its principal centerline disposed such that an imaginary vertical plane including said principal centerline bisects said included obtuse angle;

said first and second linear edges each formed with a coplanar integral locating tab extending therefrom, each said tab bent upwardly from the plane of said retainer device at a predetermined obtuse angle such that each said tab defines a raised line-contact edge disposed parallel to its linear edge contacting an associated opposed housing wall portion;

said retainer device configured and sized such that upon each said tab raised line-contact edge engaging its associated wall portion the imaginary vertical plane of said slot principal centerline bisects said included obtuse dihedral angle defined by said wall portions such that said slot principal centerline intersects the axis of said housing borehole; and whereby said retainer device arcuate edge overlies in a substantially concentric manner a peripheral annular sector of said bearing assembly thrust collar, such that upon a single threaded fastener being inserted through said attachment slot and engaging said housing bore said bearing retainer is fixedly mounted on said housing with said tab raised line-contact edges obviating rotational movement of said retainer so as to releasably secure said bearing assembly in said housing cavity.

2. The bearing retainer as set forth in claim 1, wherein said retainer arcuate edge overlies a substantially ninety degree annular sector of said bearing assembly thrust collar.

3. The bearing retainer as set forth in claim 1, wherein said included obtuse angle is of the order of 120 degrees.

* * * * *